(12) United States Patent
Wilkinson

(10) Patent No.: US 8,132,302 B2
(45) Date of Patent: Mar. 13, 2012

(54) CORD ORGANIZER

(76) Inventor: Charles Ervin Wilkinson, Lake City, FL (US)

( * ) Notice: Subject to any disclaimer, the term of this patent is extended or adjusted under 35 U.S.C. 154(b) by 0 days.

(21) Appl. No.: 12/943,410

(22) Filed: Nov. 10, 2010

(65) Prior Publication Data

US 2011/0056051 A1 Mar. 10, 2011

Related U.S. Application Data

(62) Division of application No. 11/538,474, filed on Oct. 4, 2006, now Pat. No. 7,849,568.

(51) Int. Cl.
*A44B 11/00* (2006.01)

(52) U.S. Cl. .......... 24/302; 224/580; 224/254; 224/904; 24/3.13; 248/693

(58) Field of Classification Search .................. 24/302
See application file for complete search history.

(56) References Cited

U.S. PATENT DOCUMENTS

| | | | |
|---|---|---|---|
| 1,697,833 A | 1/1929 | Lane | |
| 2,438,362 A | 3/1948 | Dunkelberger et al. | |
| 3,568,262 A | 3/1971 | Woldman | |
| 3,709,373 A | 1/1973 | Aguilar | |
| 3,819,139 A | 6/1974 | Jemison | |
| 4,123,012 A | 10/1978 | Hough | |
| 4,150,464 A | 4/1979 | Tracy | |
| 4,182,005 A | 1/1980 | Harrington | |
| 4,455,715 A | 6/1984 | Matsui | |
| 4,712,280 A | 12/1987 | Fildan | |
| 4,780,935 A | 11/1988 | Palombit | |
| 4,825,515 A | 5/1989 | Wolterstorff, Jr. | |
| 4,963,410 A | 10/1990 | Bryant | |
| 5,027,960 A | 7/1991 | Rainville | |
| 5,075,932 A | 12/1991 | Hunt et al. | |
| 5,137,158 A | 8/1992 | Brockway | |
| D342,012 S | 12/1993 | Doyle | |
| 5,348,240 A | 9/1994 | Carmo et al. | |
| 5,377,940 A | 1/1995 | Cabe et al. | |
| 5,551,128 A | 9/1996 | Townsend | |
| 5,560,564 A | 10/1996 | Maynard | |
| 5,581,850 A | 12/1996 | Acker | |
| 5,881,436 A | 3/1999 | Lyons | |
| 5,915,630 A | 6/1999 | Step | |
| 5,950,981 A * | 9/1999 | Judy | ............................ 248/693 |
| 5,992,787 A | 11/1999 | Burke | |
| 6,024,317 A | 2/2000 | Kovacik et al. | |
| 6,213,365 B1 * | 4/2001 | Stocke et al. | ................. 224/665 |

(Continued)

*Primary Examiner* — Jack W. Lavinder
(74) *Attorney, Agent, or Firm* — David L King

(57) ABSTRACT

The present invention is an organizer device having a primary back strap 10, the primary back strap 10 having a first end, a second end and a middle portion. The first end having a first buckle portion 32 and a means for suspending the back strap 20, the second end having a second buckle portion 28, the middle portion having at least one attachment location with an appended buckle portion 38 interposed between the first and second ends; and wherein the second end is provided to receive the first end of a second primary back strap. The device further has at least one removable cinch strap device 40 having a first end and a second end, the first end having two buckle portions 38, 39, a first buckle portion 39 for removable attachment to the attachment location with an appended buckle 38 on the primary back strap 10 and a second buckle portion 39 to attach to the buckle portion at the second end of the cinch strap 40 to form a loop for holding a coil of cable 100, a power tool box or other material.

3 Claims, 7 Drawing Sheets

U.S. PATENT DOCUMENTS

| | | |
|---|---|---|
| 6,253,421 B1 | 7/2001 | Kraus |
| 6,330,949 B1 | 12/2001 | DeRisio |
| 6,807,715 B1 | 10/2004 | Blair |
| 6,997,021 B2 | 2/2006 | Boni |
| 7,011,283 B2 | 3/2006 | Lemire |
| 7,092,258 B2 | 8/2006 | Hardt |
| 2003/0088948 A1 | 5/2003 | Cook |
| 2005/0205711 A1 | 9/2005 | Richardson |
| 2005/0251967 A1 | 11/2005 | McNeill |
| 2005/0257348 A1 | 11/2005 | Byers |

* cited by examiner

CORD ORGANIZER

RELATED APPLICATIONS

This application is a divisional application of co-pending U.S. application Ser. No. 11/538,474 filed on Oct. 4, 2006 entitled "Cord Organizer".

FIELD OF THE INVENTION

This invention relates to devices for holding and storing coiled lengths of flexible cabling or cord lines such as ropes, electrical cords, hoses or welding cables. In addition the device can organize and store power tool boxes and other material.

BACKGROUND OF THE INVENTION

The orderly storage of a variety of coils of lengths of lines has been a desired goal of virtually every professional craftsman and even the average homeowner.

Typically cords such as electrical extension cords are coiled and placed on a hook on a wall in a garage or workshop. Every homeowner typically has a variety of such cords, cables, hoses and ropes that need to be stored and readily available for use.

In U.S. Pat. No. 5,881,436 entitled "Portable Line Harness" and in U.S. Pat. No. 5,075,932 entitled "Cord Holder" two virtually identical storage devices are shown.

The device as described in U.S. Pat. No. 5,075,932 has a length of a highly flexible strap material, such as a textile fabric woven for example from a synthetic fiber which provides a strap which engages opposite ends of a two piece buckle in a manner providing a relatively large loop for encompassing a coil of electrical extension cord, either wholly, as bunched together in an elongated, closed coil, or partially, at one side of the coil, if the coil is circular and open at the center.

The buckle has one female part, which is recessed, to receive an elongate male plug-in member with flanking resilient catch members of the male buckle part in buckling the loop of strap about the coiled cord.

The device of this prior art invention has one end portion of the strap passed through a conventional strap-bight-forming and cinching slide fitting, then through a slotted receiving end of the first buckle part, and then was turned back on itself to again pass through slide fitting and to extend freely therefrom. To the free terminal end of such strap end portion was secured as a D-shaped ring to hang the device and its attached electrical cord from a hook for storage.

While these patented straps were a good improvement over ties, string and hooks mounted on walls to store a coil of cord, they provided no means to organize a plurality of such cords except by providing multiple hooks in the walls. Secondarily the devices provided almost no way to organize such cords in a vehicle.

Often professional craftsmen will need to carry many lines and cords to a work site, accordingly a simple way to keep coils secured and stored in a vehicle would be very desirable. Typically such coils of cords are just thrown in the back of a truck or on the bed or floor of a vehicle in piles or bundles. Often the cords get intertwined and tangled together creating a mess. Other times cords are left at a work site as there is no organized storage method to see what cable, cord, hose or rope is missing.

The average consumer fails to appreciate the rather large investment he has in electrical, acoustic or cable cords or welding cable and water hoses. However, improper storage and damage to those components costs a lot of money. For the professional craftsman both the damage issue and the lost time in untangling multiple lines results in substantial cost. Accordingly a simple, but improved cord or cable organizer that can store two or more separate lines is needed. The device described hereinafter fulfills this need with a remarkable versatility that provides an optimal organized storage and transport portability.

SUMMARY OF THE INVENTION

The present invention is an organizer device having a primary back strap, the primary back strap having a first end, a second end and a middle portion. The first end having a first buckle portion and a means for suspending the back strap, the second end having a second buckle portion, the middle portion having at least one attachment location with an appended buckle interposed between the first and second ends; and wherein the second end is provided to receive the first end of a second primary back strap. The device further has at least one removable cinch strap device having a first end and a second end, the first end having two buckle portions, a first buckle portion for removable attachment to the attachment location with an appended buckle on the primary back strap and a second buckle portion to attach to the buckle portion at the second end of the cinch strap to form a loop for holding a coil of cable, a power tool box or any other material.

Preferably each primary back strap has two attachment locations with corresponding removable cinch straps. The primary back straps can be joined to form a series of two or more straps such that four or more coils of cords can be removably attached. The end of the first primary strap can be suspended from a ceiling or wall mounted fastener such that one or more of the cinch straps can be removed with the coil or held power tool box or material being held attached without requiring the suspended primary back strap and remaining coils or material being held to be removed.

An alternative attachment device to the removable cinch strap is a removable auxiliary belt having a main strap with a first end and second end each end having a belt buckle portion one belt buckle portion being adapted to connect to the other or to be removably attached to an attachment location or an end of the primary back strap. Interposed between each first and second ends is a plurality of loop straps permanently affixed to the main strap. Each loop strap has a pair of connecting buckle portions, one portion being slideably slipped onto the loop strap and the other buckle portion being passed through the loop strap in a conventional strap bight forming cinching slide fit fashion such that when the buckle portions are passed around the coiled line or cord a self cinching loop is formed when the buckle portions are connected.

In an alternative embodiment one primary back strap can be made with at least one, preferably two or more integrally attached loop straps that are not removably attached and a second or third or more of such primary straps can be connected together to provide a suspended storage of multiple coiled cords.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

The present invention in its preferred embodiment has a primary back strap 10 and one or more removable cinch straps 40 for holding a coil of cord or cable 100 or any other material such as a power tool box.

Figures 1, 1A, 2:
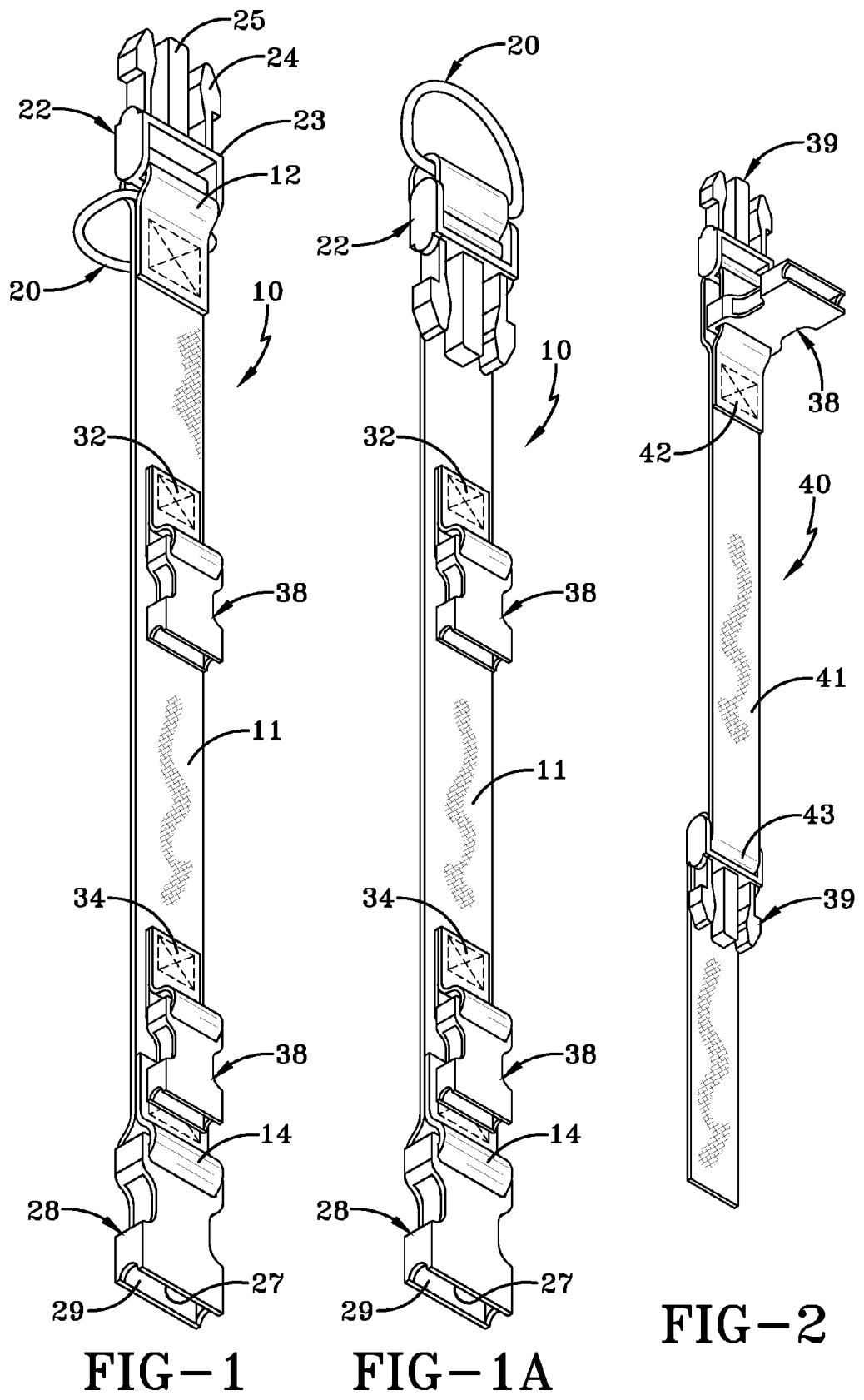
FIG. 1 is a perspective view of the primary back strap according to the present invention with the end male buckle portion extended.
FIG. 1A is a perspective view of the primary back strap with a D ring extended showing how the device can be hung or suspended.
FIG. 2 is a perspective view of a removable cinch strap according to the present invention.

With reference to FIGS. 1 and 1A the primary back strap 10 is shown in a fully extended condition having a first looped end 12 with a metal D ring 20 and a first buckle portion 22 attached. The first buckle portion 22 has a pair of laterally opposed flexible clasps 24 and a center rod 25 all adapted to enter a second buckle portion 28 and make a spring locking engagement. The first buckle portion 22 hereinafter will be referred to as the male buckle portion 22 while the second portion 28 with a hollow internal receiving cavity 29 will be referred to as the female buckle portion 28 as is understood in the art. As shown at the opposite looped end 14 of the primary back strap 10 is attached a female buckle portion 28. As shown the looped ends 12, 14 are stitched to the strap 11. Alternatively the looped ends 12, 14 could be permanently attached using heat welded joints, adhesives or fasteners such as grommets or rivets or any other secure, permanent attachment.

In FIG. 1A the D ring 20 is shown extended with the male portion of the buckle 22 folded down this is typically how the primary back strap 10 would look if hanging suspended at the D ring on a fastener.

Interposed between the ends are two female buckle portions 38 securely attached by loop ends 32 and 34 stitched to the strap 11. As shown the female buckle portions 38 are slightly smaller in size than the female buckle portion 28, 1.0 inches (2.5 cm) versus 1.5 inches (3.8 cm) in size respectively and the loop ends 32, 34 are narrower in width than the strap 11 as shown. The strap 11 as shown has a width of 1.5 inches (3.8 cm) and is preferably made from a nylon woven material. The female buckle 38 attached at loop ends 32 and closest to the D ring is spaced 6.25 inches (15.9 cm) from the stop location 23 on the male buckle. The lower female buckle 38 at attachment loop end 34 is located 8.0 inches (20.3 cm) from the other female buckle 38 and 1.75 inches (4.4 cm) from the end 27 of the female buckle. These dimensions provide a unique repeatable pattern when several primary back straps 10 are joined together. The strap 11 is 21 inches (53.3 cm) long, but when looped over at ends 12 and 14 the total length of the primary back strap between the stop locations 23, 27 of the end buckles 22 and 28 is 16 inches (40.6 cm).

Figure 5:
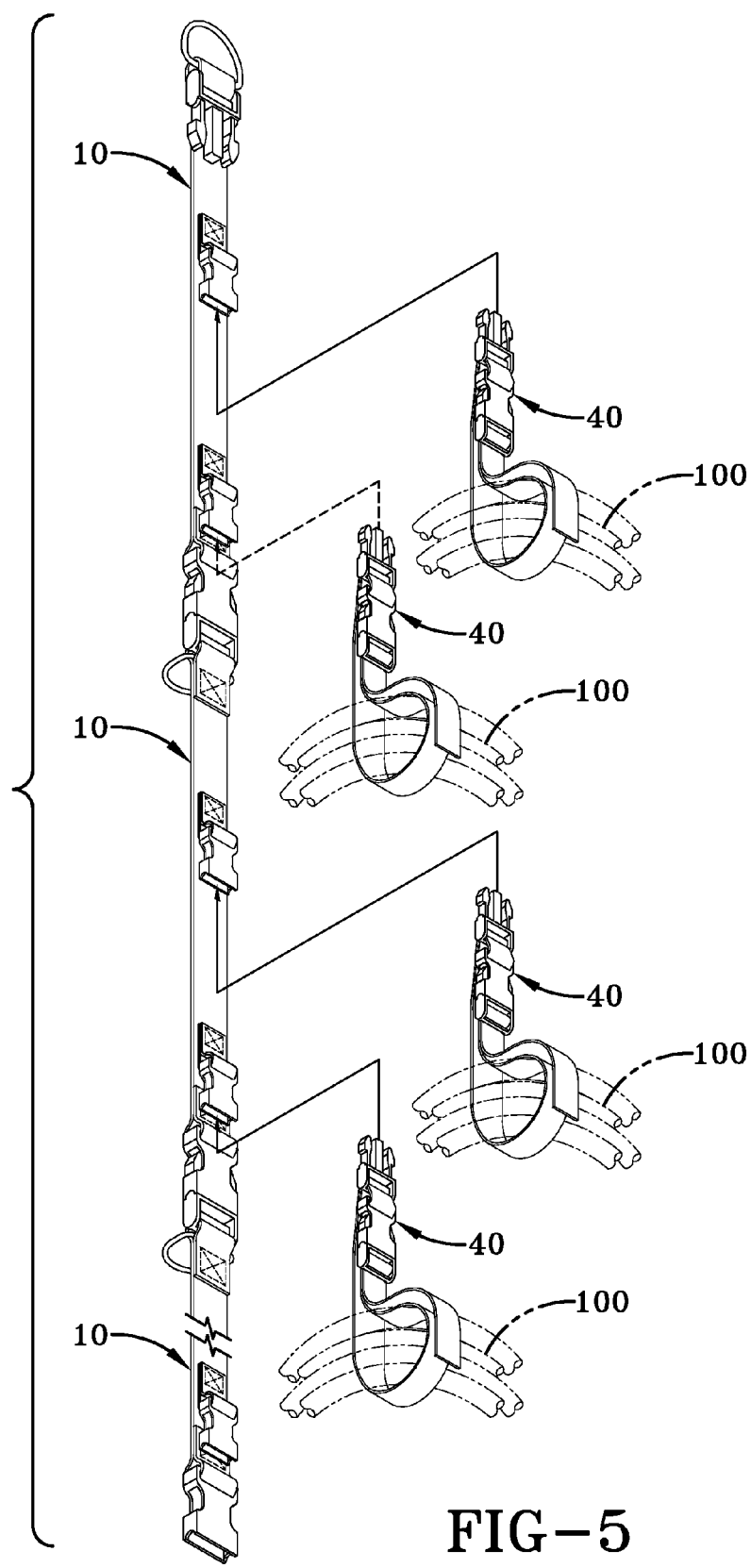
FIG. 5 is a perspective view of a plurality of primary back straps attached together at ends along with separate removable cinch straps holding a coil of cord shown separated from a respective attachment location.

With reference to FIG. 5 when additional primary back straps 10 are joined together the attachment locations 32, 34 at the buckles 38 are all spaced the same distance of about 8.0 inches (20.3 cm) in a repeating pattern. While these dimensions could vary within an inch or so say 6.0 (15.2 cm) inches to 9.0 inches (22.9 cm), the inventor has found that a location of 8.0 inches (20.3 cm) is ideal in that when a coil is suspended from a loop cinch strap 40 the open center of the coil will be approximately over the next lower buckle attachment location 34 or 32, this provides an easy way to attach or release a previously attached lower coil. The ability to reach through the center of an upper coil to release a lower coil means there is no lifting or manipulating of the other coils required to remove or attach a removable cinch strap holding a coil to the primary back strap 10.

With reference to FIG. 2 a cinch strap 40 is shown in elongated form. The cinch strap has an upper end 42 looped and stitched to the flexible strap 41, the looped end 42 holds both a male buckle portion 39 and a female buckle portion 38. At an opposite end of the strap 41 is another male buckle portion 39. The other male buckle portion 39 has the strap looped through the buckle in a conventional strap bight forming and cinch slide fitting manner as is known in the art. As shown the strap 41 has a width of 1.0 inches (2.5 cm) and a length of 19.0 inches (48.3 cm). Accordingly the buckles are preferred to be a 1.0 inch (2.5 cm) male and female buckle 39, 38 respectively. The length of the strap 41 has a portion folded back to form the loop end 42 and the length of the cinched opposite end 43 can vary depending on the position of the male buckle 39. Nevertheless the use of a strap length of about 19 inches (48.3 cm) provides an ideal circumferential length to wrap about a coil of cord or line.

Figure 3:
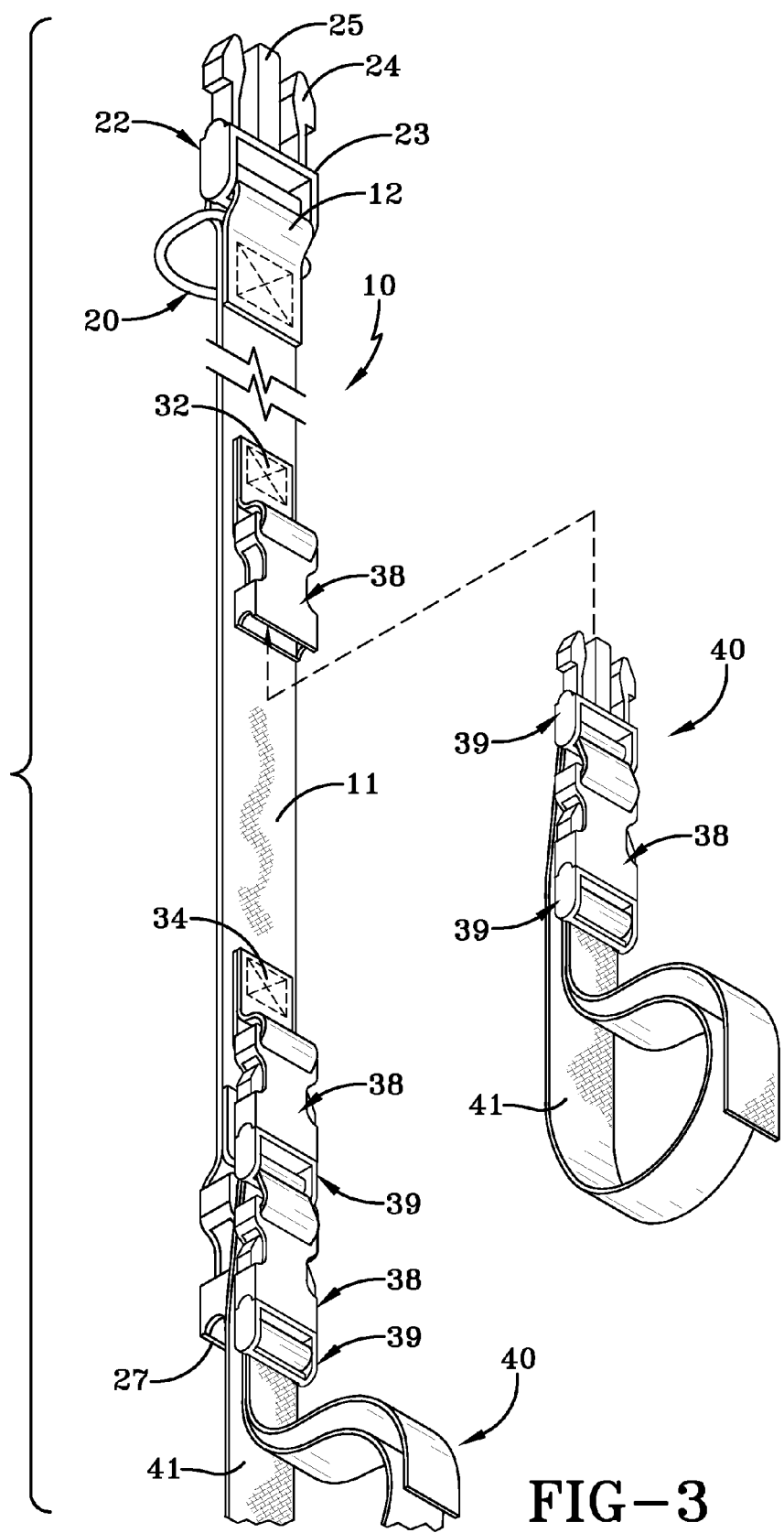
FIG. 3 is an exploded perspective view of a primary back strap with a removable cinch strap buckled into a lower attachment location and a second separate removable cinch strap with a coiled cable shown in phantom and the dashed line shown where the buckle of the removable cinch strap can be attached to the open attachment location buckle portion on the primary back strap.

With reference to FIG. 3 the cinch strap 40 is shown formed into a loop having the male buckle 39 and female buckle 38 connected as shown; the remaining male buckle 39 is shown available to be connected to a female buckle 38 at the attachment location 32 on the primary back strap 10. In the lower portion of FIG. 3 a second cinch strap 40 is shown connected to the female buckle 38 at the lower attachment location 34.

Figure 4:
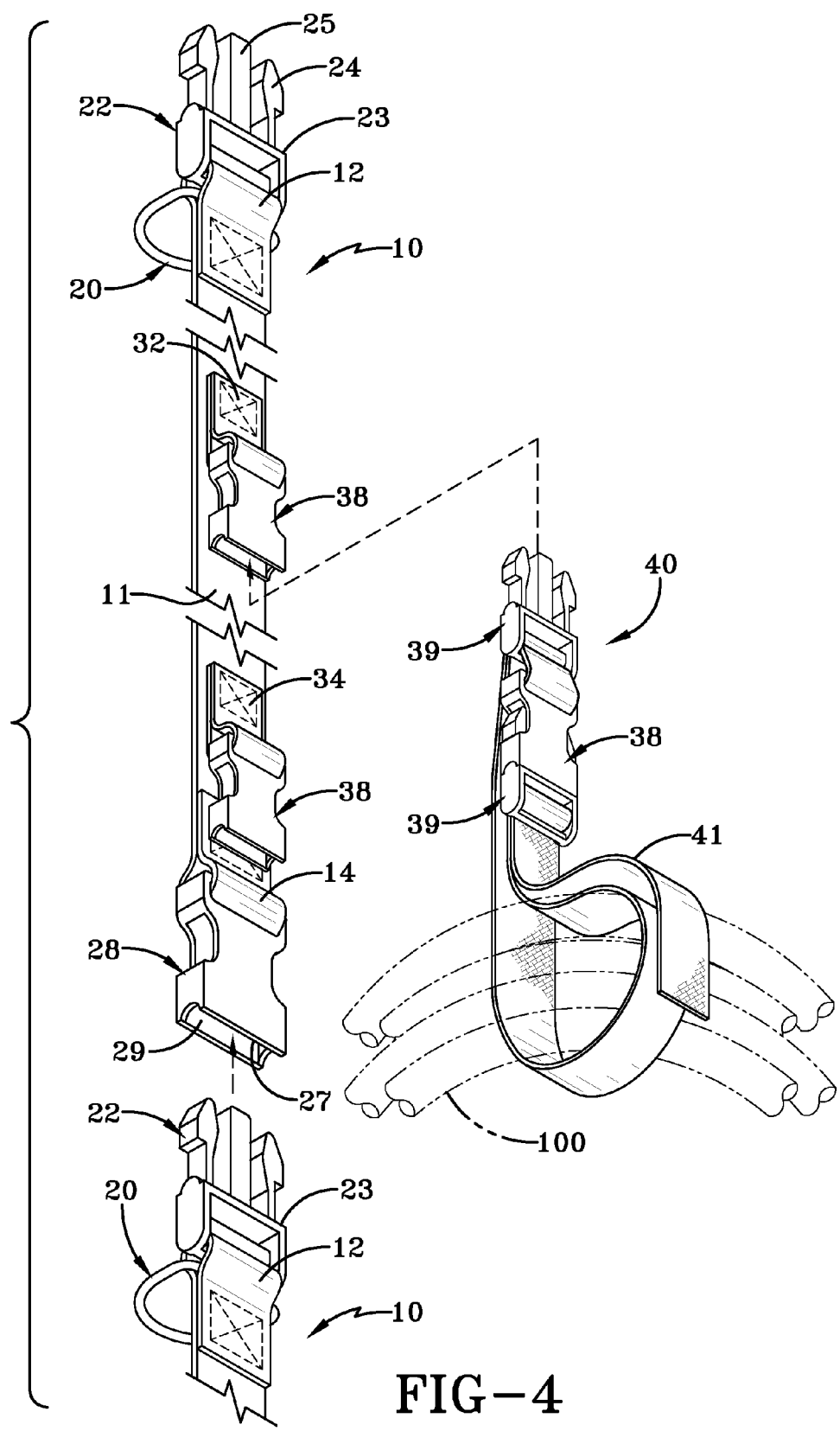
FIG. 4 is an exploded perspective view showing how two primary back straps can be joined at respective ends and how a removable cinch strap with a coil cord shown in attached in dashed lines can be removably attached at an attachment location.

With reference to FIG. 4 a view of two primary back straps 10 is shown with a cinch strap 40 holding a coil shown in dashed lines to be connected at the upper attachment location 32. At the lower end of the first primary back strap 10 the female buckle 28 is shown available to receive the male buckle 22 of a second primary back strap 10.

As shown in FIG. 5 three primary back straps 10 are shown joined together at the ends thereby extending the length of this plurality of primary back strap structures. The fact that the design has a female buckle 28 available at one end means that any number of such primary straps 10 can be joined together. The length is only limited by the ability of the straps 10, the D ring or buckle connections to support the weight. As shown the straps 10 are able to carry well over 300 pounds of coiled cords. Typically the user will limit the number of suspended back straps 10 to an amount that can be hung from a ceiling joist or garage wall, typically a 12 foot wall could carry as many as nine 16 inch long primary back straps 10. More typically five or less connected primary straps are conveniently used in about 80 inches (203.2 cm) of combined length to insure a user can reach the coils without needing a ladder. In such an arrangement 10 coils can be easily held each being held in a removable cinch strap 40.

The entire assembly of connectable primary straps 10 each with a pair of removable cinch straps 40 enables the user to design a very portable system to organize his cords for storage, but also to remove a coiled cord with the removable strap 40 attached to take directly to the job site. In practice the professional can have several suspended primary back straps 10 hung inside his truck and can simply connect the removable cinch strap 40 holding a coiled cord into an awaiting female buckle 38 on a primary back strap 10 in the truck for transport. Accordingly the use of such a device insures the coils of cords are always neatly organized and available for use.

Figure 6:
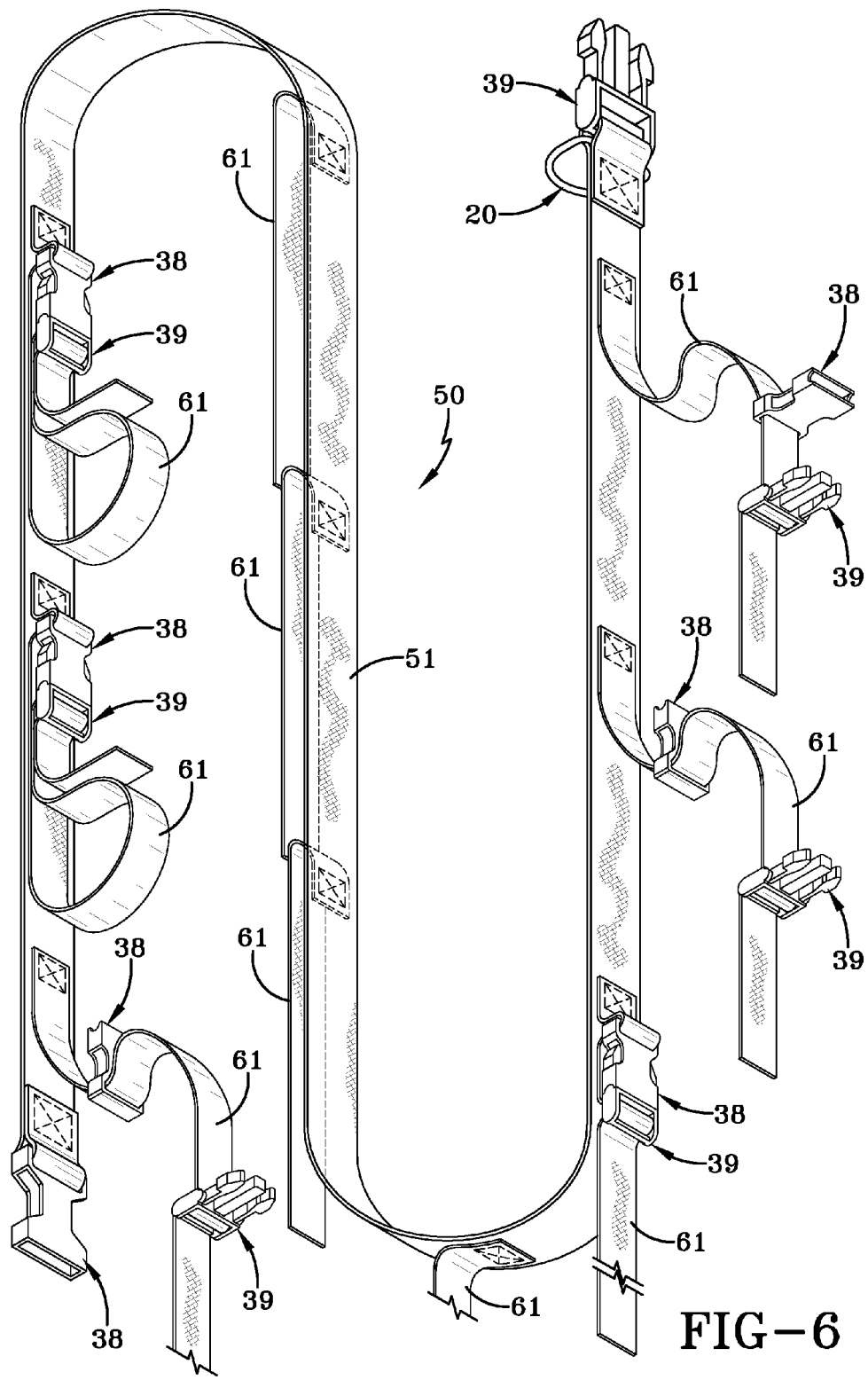
FIG. 6 is a perspective view of a removable belt assembly having a plurality of appended straps between buckled ends of a main strap wherein each appended strap has a pair of buckle portions attached to the appended strap to form a loop for holding a coiled cord, several of the straps are shown with the buckle portion removed, others opened and still others connected to show how the assembly is constructed.
Figure 7:
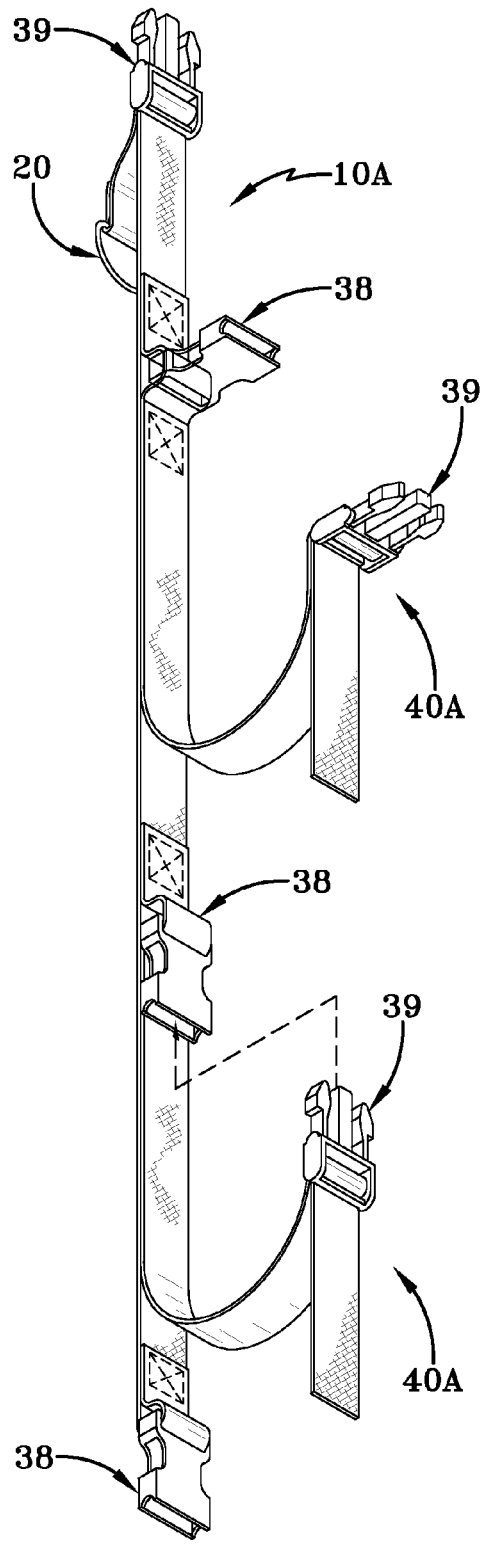
FIG. 7 is a perspective view of an alternative embodiment of the primary back strap wherein two cinch straps are permanently affixed to the primary back strap.
Figure 7A:
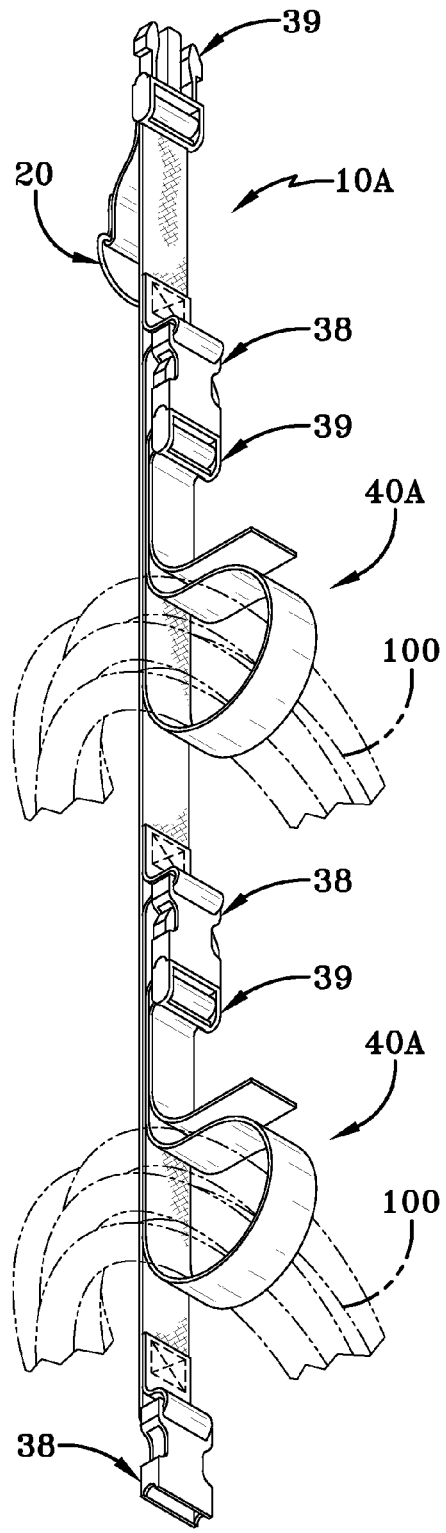
FIG. 7A is the alternative embodiment of FIG. 7 having the alternative primary back strap with the two attached cinch strap buckled to form a coil cord holding loop
Figure 8:
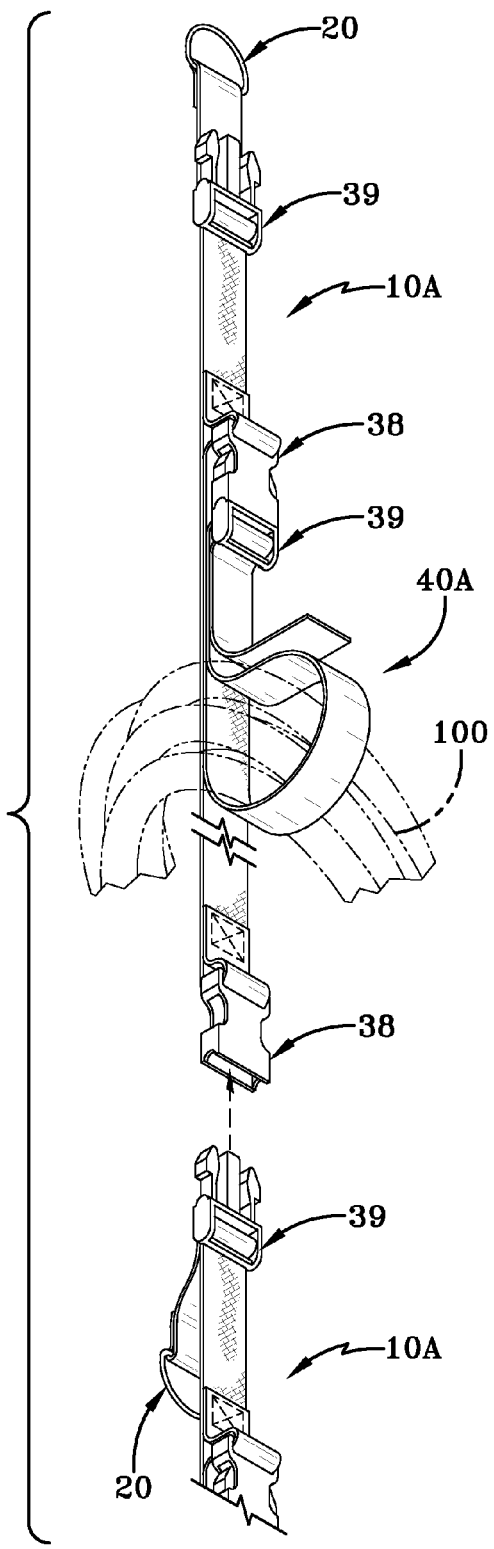
FIG. 8 shows two separate alternative primary back straps of FIG. 7 only with one permanently attached cinch strap joined.
Figure 9:
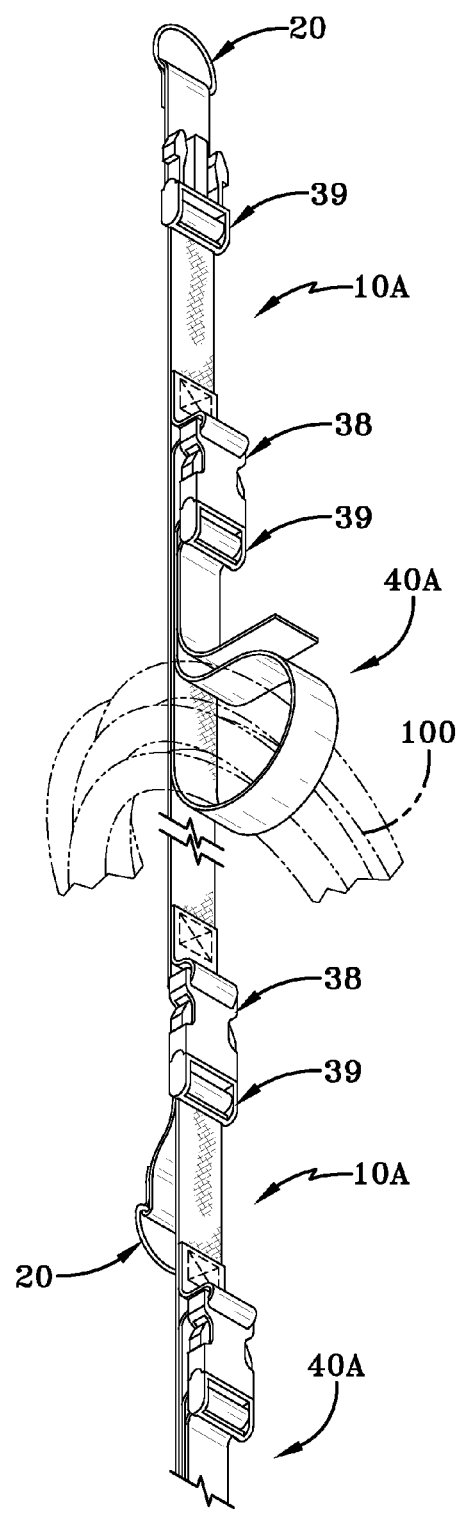
FIG. 9 is the view of the two alternative primary back straps of FIG. 8 attached together with ends of the attached cinch strap looped for holding a coil of cord.

With reference to FIG. 6 a coil carry strap belt 50 is shown having a long main length of strap material 51 extending between an end with a male buckle 39 and D ring and an opposite end with a female buckle 38 as shown the belt is about 48 inches (121.9 cm) in length. As shown the main strap has a plurality of appended stitched cinch straps 61 some are shown without buckles, others with the male/female buckle portions 38, 39 not connected, others with buckle portions 38, 39 connected. As shown the female cinch strap buckles 38 are simply slipped onto the strap 61 and are free to slide whereas the male buckles 39 are wrapped in the conventional cinch bight method so as to be securely attached and fixed at a location on the strap 61. As shown this strap belt 50 can be attached to one of the removable attachment locations 32 or 34 on a primary back strap 10 or if provided with the larger sized buckles 22, 28 at the ends of the belt 50 can be connected directly to an end of a primary back strap 10. Alternatively, the entire belt 50 can be hung at the D ring and additional belts can be connected at the other buckle 38 at the opposite end. This coil holding device is useful when a variety of coils of line need to be carried to a particular location or to be stored as a group of cables or cords. The fact that the coil must be removed from the cinch strap 60 makes this system less versatile as compared to the invention shown in FIGS. 1-5 nevertheless it can be used in combination with the earlier described device. Preferably the appended straps are spaced about 6.0 inches (15.2 cm) to 9 inches (22.9 cm) apart, more preferably at 8.0 inches (20.3 cm) as was done in the primary strap 10 previously discussed.

With reference to FIGS. 7, 7A, 8 and 9 a third and a fourth embodiment of the present invention are shown wherein the primary back strap 10A has either one or two of the cinch straps 40A permanently affixed to the main strap as opposed to being removably attached. Also the D ring is shown at the far end of the back strap 10A with the male buckle positioned on the main strap further spaced inward from the end. Also as shown the main strap 10A and the cinch straps 40A can be of the same width. The main strap 10A is also connectable at the ends to one or more additional main straps 10A and therefore employs the common novel buckle ends for extending the length. While this embodiment lacks the removable loop cinch strap feature it provides a system that eliminates the potential loss of the removable cinch strap loops in that the loops 40A are stitched to the primary back strap 10A.

The above described invention shows a variety of beneficial uses of the concept of a strap device with buckle ends to provide a method of organizing and storing coils of cables such as extension cords, welding leads/cables, construction wire or cabling, audio cables, air hoses, water hoses or power tool boxes, and any other material suitable for holding. The ability to couple several of the primary back straps 10 or 10A together enables the length of this support structure to increase as required. As shown the width and size of the buckles and strap can be varied to accommodate lighter or heavier cords as needed.

Although not shown the end buckles of the embodiment of FIGS. 1-4 could be eliminated and the primary back strap 10 lengthened to various sizes having 3, 4, 5, 6, 7, 8 or 9 or more reattachment locations each with a belt buckle portion to receive a removable loop cinch strap 40 for holding a coil or a permanently fixed loop cinch strap 40A as illustrated in figures seven through 9. In such a case the device 10 or 10A would be suspended at the D ring 20 for storage. While clearly not as versatile as the preferred shorter versions that can be connected together. These alternatives are within the scope of the present inventive concept.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A holding belt comprises:
    a main strap with a first end and second end, the first end having a means for hanging the belt wherein interposed between each first and second ends is a plurality of loop straps permanently affixed to the main strap, each loop strap has a pair of connecting buckle portions, one portion being slideably slipped onto the loop strap and the other buckle portion being passed through the loop strap in a conventional strap bight forming cinching slide fit fashion such that when the buckle portions are passed around a coiled line or cord, a power tool box or other material a self cinching loop is formed when the buckle portions are connected.

2. The holding belt of claim 1 wherein the loop straps are spaced a distance of between 6.0 inches (15.2 cm) and 9.0 inches (22.9 cm) from an adjacent loop strap.

3. The holding belt of claim 1 wherein each end has a belt buckle portion adapted to connect to the other buckle portion at the opposite end.

* * * * *